United States Patent
Prakah-Asante et al.

(10) Patent No.: US 10,562,450 B2
(45) Date of Patent: Feb. 18, 2020

(54) ENHANCED LANE NEGOTIATION

(71) Applicant: Ford Global Technologies, LLC, Dearborn, MI (US)

(72) Inventors: Kwaku O. Prakah-Asante, Commerce Township, MI (US); Yifan Chen, Ann Arbor, MI (US); Padma Aiswarya Kolisetty, Chennai (IN); Basavaraj Tonshal, Northville, MI (US); Hsin-hsiang Yang, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/749,268

(22) PCT Filed: Sep. 21, 2015

(86) PCT No.: PCT/US2015/051164
§ 371 (c)(1),
(2) Date: Jan. 31, 2018

(87) PCT Pub. No.: WO2017/052492
PCT Pub. Date: Mar. 30, 2017

(65) Prior Publication Data
US 2018/0222386 A1    Aug. 9, 2018

(51) Int. Cl.
*B60Q 9/00* (2006.01)
*G08G 1/16* (2006.01)

(52) U.S. Cl.
CPC .............. *B60Q 9/00* (2013.01); *G08G 1/167* (2013.01)

(58) Field of Classification Search
CPC ......... H04W 4/046; H04W 4/40; G06F 1/163; G06F 1/1694; G08G 1/052; G08G 1/056
See application file for complete search history.

(56) References Cited

U.S. PATENT DOCUMENTS

| | | | |
|---|---|---|---|
| 7,692,552 B2 | 4/2010 | Harrington et al. | |
| 9,037,125 B1 * | 5/2015 | Kadous ............. | H04M 1/72577 455/418 |
| 2007/0069874 A1 | 3/2007 | Huang et al. | |
| 2008/0080741 A1 | 4/2008 | Yokoo et al. | |
| 2008/0183388 A1 * | 7/2008 | Goodrich ........... | A61B 5/14546 701/300 |

(Continued)

FOREIGN PATENT DOCUMENTS

KR        101371746 B1    3/2014

OTHER PUBLICATIONS

International Search Report and Written Opinion dated Dec. 15, 2015 re PCT/US2015/51164.

*Primary Examiner* — Mirza F Alam
(74) *Attorney, Agent, or Firm* — Frank A. MacKenzie; Bejin Bieneman PLC

(57) ABSTRACT

A time to lane crossing that is a measure of a time for a vehicle to cross from a lane to another lane, is determined. A lane negotiation characteristic that is a measure of a mean vehicle offset front the lane, is determined. A first mechanism is actuated in a wearable device when the time to lane crossing is below a first threshold and the lane negotiation characteristic exceeds a second threshold. A second mechanism is actuated in the vehicle when a lane negotiation controller detects an imminent lane departure.

15 Claims, 2 Drawing Sheets

(56) References Cited

U.S. PATENT DOCUMENTS

| | | | |
|---|---|---|---|
| 2011/0153532 A1* | 6/2011 | Kuge | B60W 40/09 |
| | | | 706/12 |
| 2012/0206252 A1* | 8/2012 | Sherony | B60W 30/12 |
| | | | 340/438 |
| 2012/0212353 A1 | 8/2012 | Fung et al. | |
| 2013/0141576 A1* | 6/2013 | Lord | G08G 1/04 |
| | | | 348/148 |
| 2014/0111647 A1 | 4/2014 | Atsmon et al. | |
| 2015/0154886 A1 | 6/2015 | Aldossary | |
| 2018/0022358 A1* | 1/2018 | Fung | B60W 40/08 |
| | | | 701/36 |

* cited by examiner

ENHANCED LANE NEGOTIATION

CROSS-REFERENCE TO RELATED APPLICATIONS

This application is a national stage of, and claims priority to, Patent Cooperation Treaty Application No. PCT/US2015/051164, filed on 21 Sep. 2015, which application is hereby incorporated herein by reference in its entirety.

BACKGROUND

Lane Departure Warning (LDW) systems provide a way for vehicle drivers to adjust their driving behavior if a lane departure of a vehicle is imminent. An important feature of such systems may be providing output indicating an impending lane departure so that the driver can take corrective action. Current systems may include actuation of mechanisms that provide output to all vehicle occupants, other than the vehicle driver.

DETAILED DESCRIPTION

Figure 1:
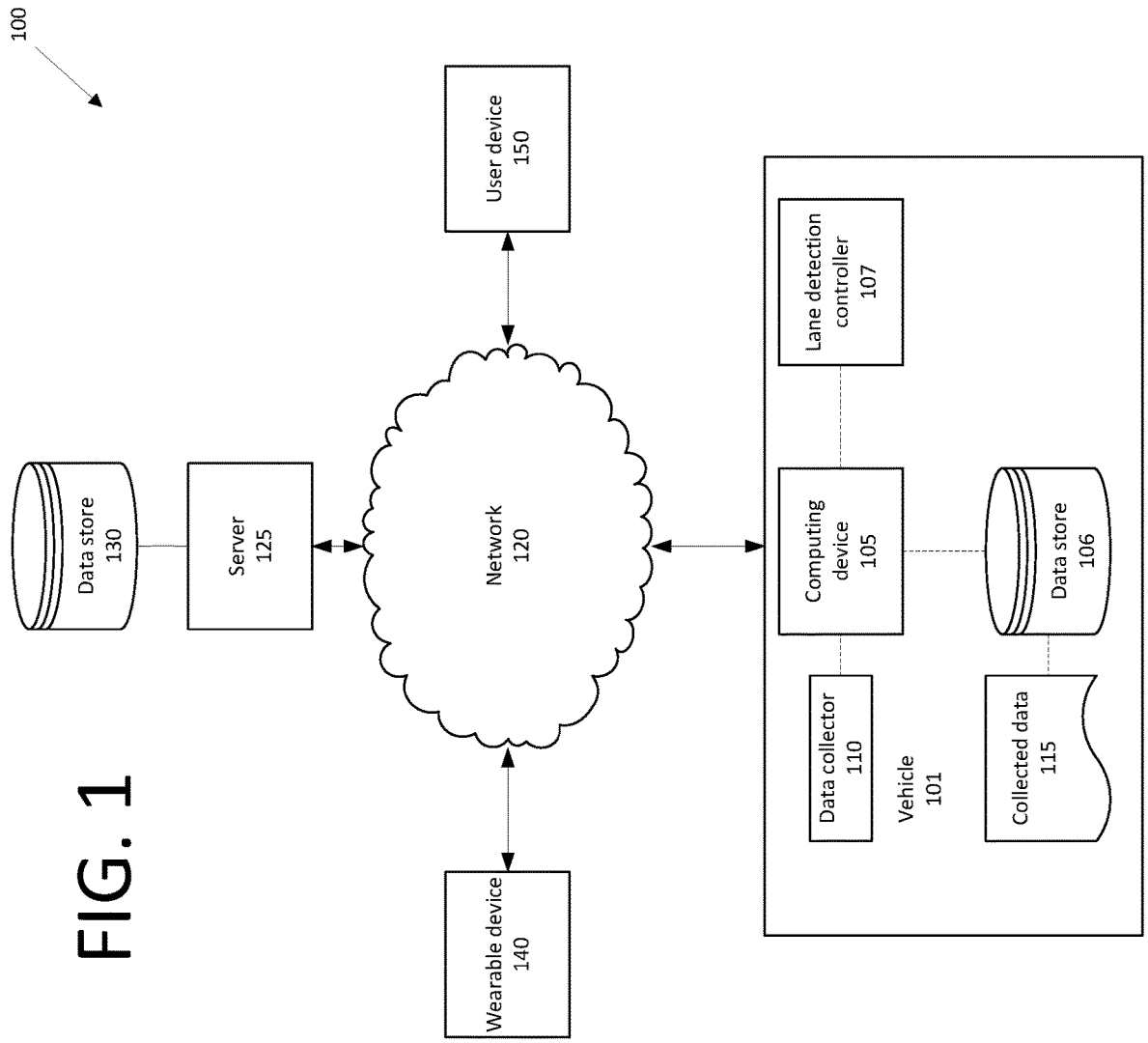
FIG. 1 is a block diagram of an example system for including a wearable device providing output indicating a possible lane departure.

FIG. 1 illustrates a system 100 including a wearable device 140 communicatively coupled to a vehicle 101 computing device 105. The computing device 105 is programmed to receive collected data 115, from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering including Time-to-Lane Crossing (TLC), biometric data related to a vehicle 101 operator, e.g., heart rate, respiration, pupil dilation, body temperature, state of consciousness, etc. Further examples of such metrics may include measurements of vehicle systems and components (e.g. a steering system, a powertrain system, a brake system, internal sensing, external sensing, etc.). The computing device 105 may be programmed to collect data 115 from the vehicle 101 in which it is installed, sometimes referred to as a host vehicle 101, and/or may be programmed to collect data 115 about a second vehicle 101, e.g., a target vehicle.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

A LDW controller 107, as is known, is included in the vehicle 101 and includes a processor and a memory, the processor storing instructions to determine whether the vehicle 101 is about to leave a current lane and, upon such determination, to actuate one or more vehicle mechanisms without driver intervention, e.g., braking, steering, throttle, etc. Further, the LDW controller 107 may include or be connected to an output mechanism to indicate a potential lane departure, e.g., sounds and/or visual indicators provided via the vehicle 101 HMI.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101, including the host vehicle and/or the target vehicle. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to measure a distance between the vehicle 101 and other vehicles or objects. Yet other data collectors 110 could include cameras, breathalyzers, motion detectors, etc., i.e., data collectors 110 to provide data 115 for evaluating a condition or state of a vehicle 101 operator.

Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by the data collectors 110 and/or computed from such data. The computing device 105 may use the collected data 115 to develop a lane departure profile for the occupant. The lane departure profile may incorporate the occupant's driving habits and characteristics, e.g., age, experience driving, etc., as well as the collected data 115, e.g. road condition, movement of the vehicle 101, etc. The lane departure profile may be used by the LDW controller 107 to detect an imminent lane departure. The computing device 105 may create several lane departure profiles for different occupants and store them in the data store 106.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be programmed to determine an appropriate action for one or more vehicles 101, and to provide direction to the computer 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, records relating to potential incidents generated as described herein, lane departure profiles, etc. Further, the server 125 may store information related to particular vehicle 101 and additionally one or more other vehicles 101 operating in a geographic area, traffic conditions, weather conditions, etc., within a geographic area, with respect to a particular road, city, etc. The server 125 could be programmed to provide alerts to a particular vehicle 101 and/or other vehicles 101.

A wearable device 140 may be any one of a variety of computing devices including a processor and a memory, as well as communication capabilities that is programmed to be worn on a driver's body. For example, the wearable device 140 may be a watch, a smart watch, a vibrating apparatus, etc. that includes capabilities for wireless communications using IEEE 802.11, Bluetooth, and/or cellular communications protocols. Further, the wearable device 140 may use such communications capabilities to communicate via the network 120 and also directly with a vehicle computer 105, e.g., using Bluetooth.

The system 100 may include a user device 150. The user device 150 may be any one of a variety of computing devices including a processor and a memory, e.g., a smartphone, a tablet, a personal digital assistant, etc. the user device 150 may use the network 120 to communicate with the vehicle computer 105 and the wearable device 140.

Figure 2:
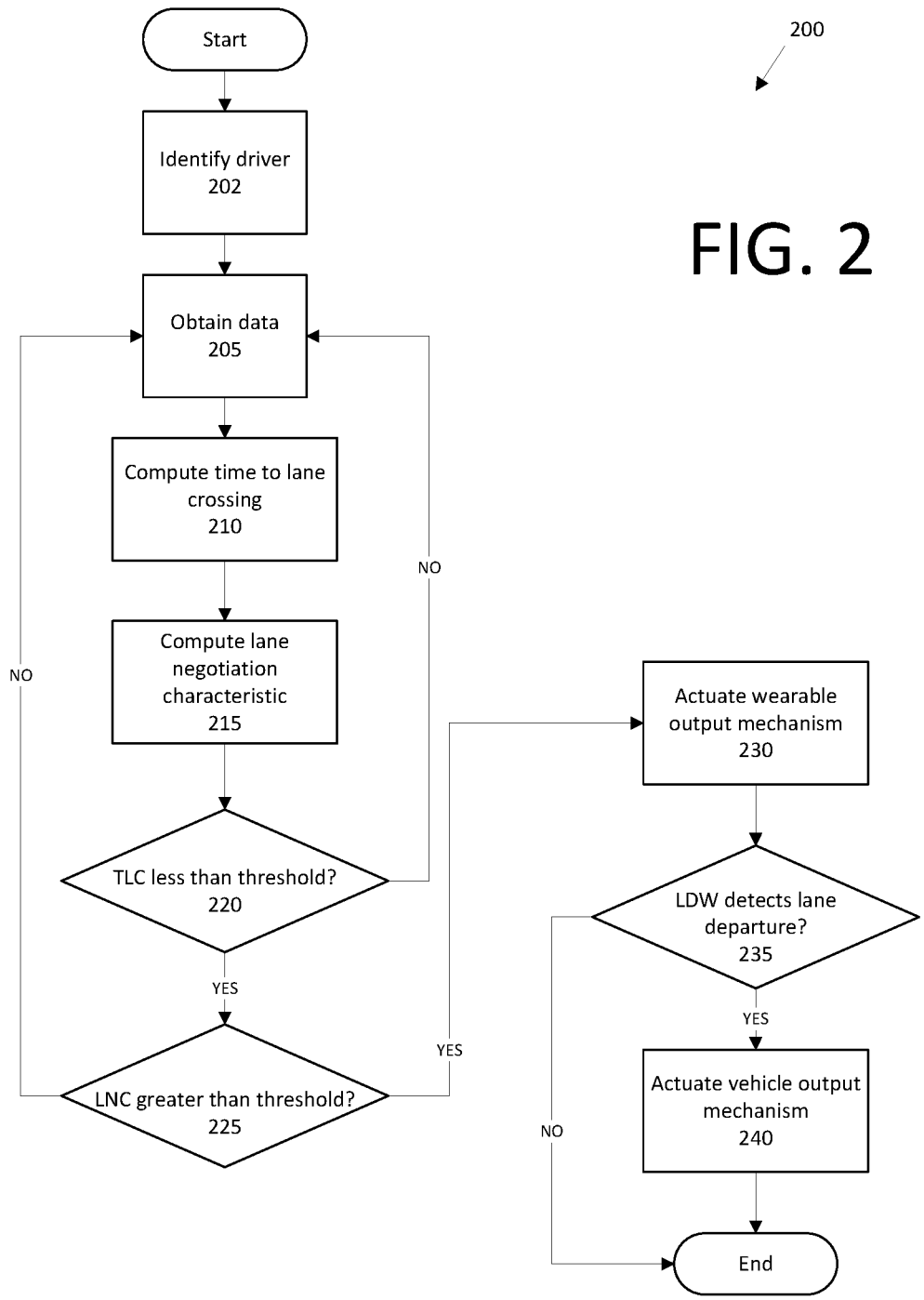
FIG. 2 is a block diagram of an example process for providing an indication of a possible lane departure from a wearable device.

FIG. 2 illustrates an example process 200 employing the wearable device 140 in conjunction with the LDW controller 107. The process 200 begins in a block 202, in which the computing device 105 identifies a vehicle 101 occupant. The computing device 105 may identify the driver in one or more manners, e.g., receiving data from one or more of the wearable device 140, the user device 150, and/or the data collectors 110. For example, as is known, the occupant could be identified using image recognition techniques in the computer 105 using data 115 from a camera data collector 110, a user identity could be input via a device 140 of a vehicle 101 HMI, or the device 140 could identify the user/occupant via collected biometric data, e.g., a fingerprint, etc. Upon identifying the occupant, the computing device 105 may retrieve from its data store 106 information about the occupant, including age, size, driving skill level, preferred mechanisms for receiving information (e.g., haptic, audio, etc.), lane departure profile, etc.

Next, in a block 205, the computing device 105 collects data 115 from the data collectors 110. The data 115 may include lane marker position, vehicle 101 position relative to the lane markers, vehicle 101 velocity, forward trajectory of the vehicle 101, lateral movement of the vehicle 101, etc.

Next, in a block 210, the computing device 105 determines the time to lane crossing (TLC) of the vehicle 101. The TLC is a measure of an estimated time for the vehicle 101 to cross from the present lane to another lane. The TLC is obtained from the vehicle LDW controller 107.

Next, in a block 215, the computing device 105 calculates a lane negotiation characteristic (LNC). The LNC is a measure of driver lane behavior based on lane offset information from the data collectors 110. The computing device 105 may use the wearable device 140 and the user device 150 to calculate the LNC in a distributed computing process depending on the amount of computing resources available on each device. The LNC learning system characterizes the driver lane behavior based on lane offset information obtained from the vehicle vision system. The mean and variance of the vehicle offset position is recursively computed in real-time to obtain a personalized driver LNC.

Next, in a block 220, the computing device 105 determines whether the TLC is lower than a first threshold. The first threshold may be adjusted based on the information retrieved about the occupant in the block 202, e.g., a novice driver may have a lower threshold to account for increased reaction time, a skilled driver may have a higher threshold, etc. further, the threshold may be in addition to, and set lower than, a threshold used in presently existing lane departure warning systems 107, as mentioned above. The threshold may also be determined at least in part on the vehicle speed, road conditions, current weather, and/or other data 115 collected by the data collectors 110. The first threshold may also be determined at least in part from at least one of the lane departure profiles stored in the data store 106 and/or the server 125. If the TLC is not below the first threshold, the process 200 returns to the block 205 to collect more data 115. Otherwise, the process 200 continues in a block 225.

In the block 225, the computing device 105 determines whether the LNC is greater than a second threshold value. The first and second thresholds are generally established to cause actuation of a mechanism in the wearable device 140 before the conventional lane departure warning controller 107 triggers an action, e.g., control of one or more vehicle 101 components and/or actuating a vehicle 101 warning mechanism. The second threshold may be determined at least in part from at least one of the lane departure profiles stored in the data store 106 and/or the server 125. If the LNC is not greater than the threshold value, the process 200 returns to the block 205 to collect more data 115. Otherwise, the process 200 continues in a block 230.

In the block 230, the computing device 105 provides an instruction to the wearable device 140 to actuate one or more output mechanisms. The output mechanisms may include haptic output, e.g. a vibration, audio output, and/or visual output, e.g. flashing lights, flashing colors, etc. Based on the information from the block 205, the one or more output mechanism may be selected according to the occupant. For example, an occupant who is hard of hearing may have a stronger vibration output, while another occupant may prefer a visual output. Advantageously, the computing device 105 may be programmed, e.g., including setting the threshold of the block 220, to cause actuation of the wearable device output prior to an alert, warning, or evasive action implemented by a conventional lane negotiation controller 107, e.g., a system that provides an indication of, or reacts to, an imminent collision by actuating vehicle lights, sounds, brakes, etc. Thus, the driver of the vehicle 101 in the context of the present system 100 can take evasive and/or avoidance action earlier, and in a safer manner, than in presently existing systems.

Next, in the block 235, the computing device 105 determines whether the lane detection warning controller 107 detects an imminent lane departure, i.e., the vehicle 101 will move from the current lane to another lane in the next few seconds. The LDW system uses the data 115 to determine whether the vehicle 101 is about to exit the lane. If the LDW controller 107 does not detect an imminent departure, the process 200 ends. Otherwise, the process 200 proceeds to a block 240.

In the block 240, the computing device 105 activates one or more second output mechanism, i.e. a vehicle alert, using the LDW controller 107 and the process 200 ends. The second output mechanisms may include, e.g., a vibrating steering wheel, an alarm through the vehicle speakers, a flashing light on the dashboard, etc.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   actuate a lane detection warning controller to detect a lane departure;
   determine a time to lane crossing that is a measure of a time for a vehicle to cross from a lane to another lane;
   determine a lane negotiation characteristic that is a measure of a mean vehicle offset of a vehicle position within the lane;
   provide a first output in a wearable device of a driver when the time to lane crossing is below a first threshold and the lane negotiation characteristic exceeds a second threshold;
   then, after providing the first output in the wearable device of the driver, detect an imminent lane departure with the lane detection warning controller; and
   then, upon detecting the imminent lane departure, provide a second output in the vehicle.

2. The system of claim 1, wherein the instructions further include instructions to collect data from the vehicle.

3. The system of claim 2, wherein the data include at least one of vehicle speed, vehicle trajectory, and visual inputs.

4. The system of claim 1, wherein the instructions further include instructions to provide the first output only in the wearable device.

5. The system of claim 1, wherein the first output is a haptic output.

6. The system of claim 1, wherein the instructions further include instructions to develop a lane departure profile for the driver based at least in part on driving behavior of the driver.

7. The system of claim 6, wherein the memory stores a plurality of lane departure profiles for a plurality of drivers.

8. The system of claim 6, wherein the first and second thresholds are based at least in part on the lane departure profile for a current driver.

9. The system of claim 1, wherein the instructions further include instructions to provide the first output in the wearable device before providing the second output in the vehicle.

10. A method, comprising:
    actuating a lane detection warning controller to detect a lane departure;
    determining a time to lane crossing that is a measure of a time for a vehicle to cross from a lane to another lane;
    determining a lane negotiation characteristic that is a measure of a mean vehicle offset of a vehicle position within the lane;

providing a first output in a wearable device of a driver when the time to lane crossing is below a first threshold and the lane negotiation characteristic exceeds a second threshold;

then, after providing the first output in the wearable device of the driver, detecting an imminent lane departure with the lane detection warning controller; and then, upon detecting the imminent lane departure, providing a second output in the vehicle.

11. The method of claim 10, further comprising collecting data from the vehicle.

12. The method of claim 11, wherein the data include at least one of vehicle speed, vehicle trajectory, and visual inputs.

13. The method of claim 11, wherein the data are collected by data collectors, the data collectors including at least one of radar, lidar, image sensors, and motion sensors.

14. The method of claim 10, further comprising developing a lane departure profile for the driver based at least in part on driving behavior of the driver.

15. The system of claim 1, wherein the instructions further include instructions to determine the lane negotiation characteristic with a first device that is the wearable device and a second device that is a user device.

* * * * *